United States Patent [19]

Rohra Suda et al.

[11] Patent Number: 5,282,265
[45] Date of Patent: Jan. 25, 1994

[54] KNOWLEDGE INFORMATION PROCESSING SYSTEM

[75] Inventors: Aruna Rohra Suda, Yokohama; Yoshie Ito, Atsugi; Takako Takeda, Sagamihara, all of Japan

[73] Assignee: Canon Kabushiki Kaisha, Tokyo, Japan

[21] Appl. No.: 982,050

[22] Filed: Nov. 25, 1992

Related U.S. Application Data

[63] Continuation of Ser. No. 915,743, Jul. 21, 1992, abandoned, which is a continuation of Ser. No. 770,717, Oct. 3, 1991, abandoned, which is a continuation of Ser. No. 416,546, Oct. 3, 1989, abandoned.

[30] Foreign Application Priority Data

Oct. 4, 1988 [JP] Japan .................................. 63-250517
Oct. 24, 1988 [JP] Japan .................................. 63-268692

[51] Int. Cl.$^5$ ............................................. G06F 15/00
[52] U.S. Cl. ...................................... 395/12; 395/51; 395/63; 364/419.08
[58] Field of Search ............................ 395/12, 51, 63; 364/419

[56] References Cited

U.S. PATENT DOCUMENTS

| | | | |
|---|---|---|---|
| 4,670,848 | 6/1987 | Schramm et al. | 364/513 |
| 4,736,296 | 4/1988 | Katayama et al. | 364/419 |
| 4,905,138 | 2/1990 | Bourne | 364/200 |
| 4,914,590 | 4/1990 | Loaman et al. | 364/419 |

OTHER PUBLICATIONS

Covington, et al, *Prolog Programming in Depth*, 1988, Chapter 13, p. 392.
Frenzel, *Crash Course in Artificial Intelligence and Expert Systems*, 1987, pp. 157, 160.

*Primary Examiner*—Allen R. MacDonald
*Attorney, Agent, or Firm*—Fitzpatrick, Cella, Harper & Scinto

[57] ABSTRACT

A system capable of automatically generating an answer in response to a query or an instruction such as a letter writing instruction input to the system in the form of a natural language. The system understands the goal of the natural language input and retrieves information from knowledge bases to formulate a plan and an action for achieving the goal.

15 Claims, 26 Drawing Sheets

G K B

NOUNS:

Livingbeings have goals. etc.

Person is a Livingbeing.
    has a Name,
        a Surname,
        Height,
        Friends,
    a Goal,
        Relationship to other Persons, etc.

Animal is a Livingbeing,
    has a Name,
        a Habitat, etc.

Things have a Name,
        a Class,
        a Composition, etc.

Places have a Name,
        a Geographical Location, etc.

ACTIONS (or VERBS):

Every action has an Actor,
        Object,
        Instrument,
        :

Time of Action,
        Causal Action,
        Resultant Action, etc.

ex. action: Ingest has Object - Things,

Mental Transfer has Instrument - Things, etc.

FIG. 5A

DKB

Every GOAL is possessed by one (or more) Actor
  has one or more PLANS for satisfying that GOAL.

Every PLAN is for satisfying some GOAL
  has a List of ACTIONS to be performed.

ex.  GOAL - satisfy Hunger
   PLAN - Go to Restaurant, Cook, Buy Cooked Food and Eat at Home PLAN - Go Somewhere
   ACTIONS - Select the Place, Select Transportation Method,
       Take the Selected Transport, etc.

GOAL - Get Information
   PLAN - Request Information from appropriate person,
       Search for Information in a Library etc.
       Visit appropriate person and discuss etc.

PLAN - Visit a Person
   ACTIONS - Go to the Place where Person is, meet Person,
       Exchange Information, etc., Return to Initial Place.

etc.

FIG. 5B

TKB ex. Describing a situation:
1. list most basic items/concepts
2. list items/concepts based on (1) and their connection (if necessary)
3.
   ⋮
   and so on.
4. list final inference or summary Letter writing:
1. introduce oneself (if addressee is a new person)
2. list context
3. list purpose/goal
4. list proposed plan for that goal
5. list purpose of the letter, i.e., expectation from the addressee
6. list closing remarks (expression of gratitude etc.)

FIG. 5C

IDB

| Person Name & address | Relation |
|---|---|
| Self | name<br>  Title<br>    Work - Research<br>        Lens Design<br>    Relevant Work - Smith's Theory of<br>           Aberrations<br>    Responsibility - Give orders for Lens<br>           fabrication<br>        Buy Lens Design<br>           fabrication equipment<br>    Group - 4 persons<br>    Company's information - name<br>           total Staff |
| H. Nakamura<br>------------Inc.<br>Tokyo | Customer |
| A. Garden<br>-------Sales Co. | Colleague |
| John Smith<br>Professor<br>Univ. of Rochester<br>New York USA | Theory of Aberrations |
| T. Suzuki<br>-----------Inc.<br>Osaka | Design |
| etc. | |

FIG. 5D

INPUT: write a letter to Smith about visiting Rochester
after the OSA meeting in April

↓

[PARSER]

↓

*. sender - write to - Smith
A. sender - go to - Rochester - April
B. sender - go to - OSA meeting - April
C. (A) occurs after (B)

↓

[UNDERSTANDER]

↓

D. from IDB or User:
   1 Smith is a professor of Univ. of Rochester
   2 sender - Smith relationship
     sender is working on a lens design system
     Smith's theory of aberration is used for sender's system
   3 OSA meting is OSA annual meeting which will be held in US
E. sender - has goal of - (A) & (B)
F. sender - has - goal of - getting information
                            by discussing with smith
G. plan - for goal (F) : go to Rochester (Univ. of Rochester)
                   go to US
H. plan - for goal (B) : go to US
I. plan - for goals (A) & (B) : go to US

↓

[PLAN CONSTRUCTOR]

GKB

NOUNS:

Livingbeings have goals, etc.

Person is a Livingbeing,
    has a Name
        a Surname,
           Height,
           Weight,
           Friends,
    a Goal,
        Relationship to other Persons, etc.

Animal is a Livingbeing,
    has a Name,
        a Habitat,
        a Body, etc.

Things have a Name,
        a Class,
        a Composition, etc.

Place have a Name,
        a Geographical Location, etc.

Mental object has a Name,
           Concept, etc.
                ex. Happiness, Crying at Night Body part ⟶ Stomach,
                Mouth,
                Legs, etc.

FIG. 9A

GKB

ACTIONS (or VERBS):

Every ACTION has an Actor,
                Object,
                Instrument,
                :

Time of Action,
                Causal Action,
                Resultant Action, etc.

ex.   Action :  Ingest has Object - Things,
                Mental Transfer has Instrument - things, etc.
                Physical Transfer → go
                                come
                                move
                      Negative → stop
              Change situation → feel hungry
                                wash
                                arrange

Adjectives

- - - - - - - - - - - - - - - - -

Adverbs

Every THEME is possessed by one (or more) Actor
        generates one (or more) operating GOAL (s)

Every GOAL has one or more PLANS for satisfying that GOAL.

Every PLAN is for satisfying some GOAL.
        has a list of ACTIONS to be performed.

ex.  THEME - Be Healthy
     GOAL  - Satisfy Hunger
           - Avoid Disease
           - Do Exercise
     PLAN  - Go to Restaurant, Cook, Go to buy cooked meal, Eat at Home, THEME - Be Happy / Content
     GOAL  - Avoid Argument
           - Get All Necessities (ex. Toys, Clothes etc.)
           - Satisfy All Unsatisfied Goals 1. Situation - Not Well
   Goal of Action - Avoid disease
   PLAN          - Know disease, cure disease 2. Situation     - Crying
   Goal of Action - Satisfy All unsatisfied Goals
   PLAN          - Search unsatisfied Goals GOAL          - Satisfy Huger
   PLAN          - Drink Milk, Eat Rice

FIG. 9C

TKB ex. Describing a situation :
1. list most basic items/concepts
2. list items/concepts based on (1) and their connection (if necessary)
3.
.
.
.
   and so on,
4. list final inference or summary Letter writing :
1. introduce oneself (if addressee is a new person)
2. list context
3. list purpose/goal
4. list proposed plan for that goal
5. list purpose of the letter, i. e., expectation from the addressee
6. list closing remarks (expression of gratitude etc.)

| | | |
|---|---|---|
| Child's Name | - Akiko | (fixed parameter) |
| Age | - 1 yr. 2 month | (variable    ) |
| Height | - 70 cm | (    ,,    ) |
| Weight | - 15 kg. | (    ,,    ) |
| Food | - ..... | (    ,,    ) | etc.

| | | |
|---|---|---|
| History | - Jan. 10 - 12, 1988 | had cold, consulted Doctor A |
| | - Jan. 25 - 26, 1988 | loose motions |
| | - Mar. 3    , 1988 | crawled a little |
| | . . . | |
| | . . . | |
| | . . . | |
| | - Sep. 10    , 1988 | walked about 1 meter unsupported |
| | - Sep. 15    , 1988 | got vaccinated | etc.

FIG. 9E

| [Ideal Type] | ---Natural language Dialog / Individual Information Storage / Judging--- |
|---|---|
| USER | SYSTEM |
| | What's Seems to be the Matter ? |
| She won't Stop to Crying at Night | |
| Well, She could be Hungry | Last Time it was Hunger, Remember |
| | Maki Takes Milk, doesn't She ?<br>How often do You Feed Her ? |
| 5 Times a Day, 180 cc Each Time | |
| | That's Enough for Maki, a 5-Month-Old Baby. Hunger should not be the Cause. Could it be Lack of Exercise ? |
| I don't Think so because We Added 30 Minutes a Day to Her Exercise after the Night Cry Began. | |
| | How about Her Midday Nap ?<br>How much does She Sleep Everyday ? |
| Once in the Morning and Once in the Afternoon | |
| | Well, I Recommend that Her afternoon Nap be Made Earlier and Shorter |
| OK, I'll Try that | |
| | Fine. Please Let me Know the Result |

FIG. 11

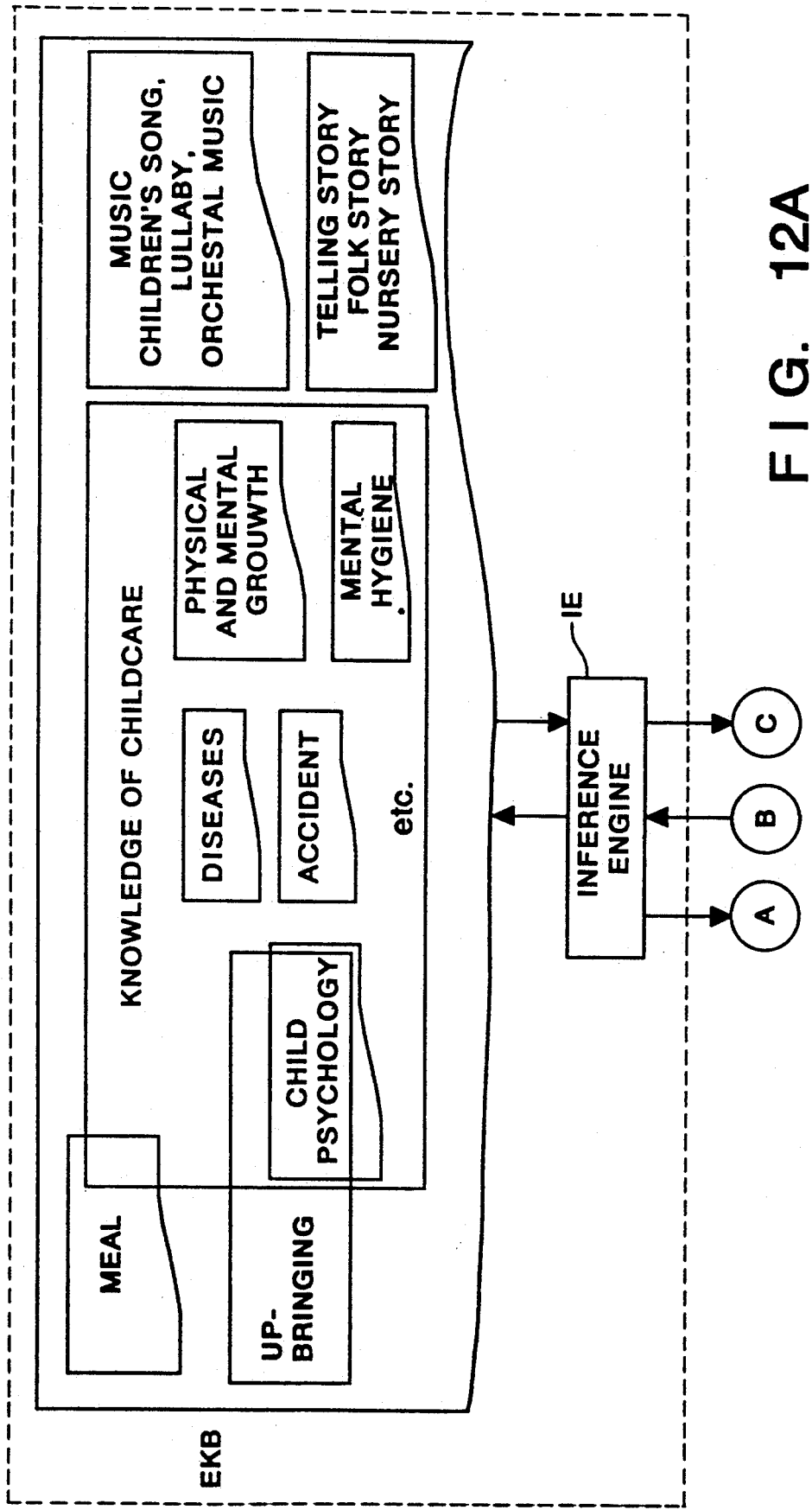
F I G. 12A ex. THEME - Manage House

GOAL  - Have Everything Working
            - Look after Children

- Provide all necessities
              (ex. - Meals Washed Clothes etc.)

GOAL  - Provide Meals
    PLAN  - Cook Meals, Buy Ready Made
                         Foods GOAL  - Cook Meals
    PLAN  - Have Ingredients, decide recipe, cook, serve GOAL  - Decide Recipe
    PLAN  - Know Recipe, Search for Recipe

FIG. 14

| USER | SYSTEM |
|---|---|
| I'm at a Loss for What to have Today | Can I Help You ? Run Short of Something |
| No. I Want to Cook Something Nice but I can't Think of Anything | OK. I'll Help You. What Ingredients are Available ? |
| Well, Today I have some Ham, Cauliflower, Lettuce and Celery. Oh, I also have some Egg Plants. | Fine, You can Make Ham-Stuffed Cauliflower, What We Call Gipsy Pie, a German Dish. If You can Come Up With some Apples, You can Make Italian Salad with Lettuce and Celery. |

FIG. 15

KNOWLEDGE INFORMATION PROCESSING SYSTEM

This application is a continuation of application Ser. No. 07/915,743 filed Jul. 21, 1992, now abandoned, which is a continuation application of Ser. No. 07/770,717 filed Oct. 3, 1991, now abandoned, which is a continuation application of Ser. No. 07/416,546 filed Oct. 3, 1989, now abandoned.

BACKGROUND OF THE INVENTION

1. Field of the Invention

The present invention relates to a knowledge information processing system such as, for example, an expert system. More particularly, the invention relates to an information processing system which, upon receipt of information, for example, describing a daily living problem expressed in a natural language ordinarily used by human beings, provides knowledge or information concerning a skill which is useful in overcoming the problem. Still more particularly, the invention is concerned with a system capable of performing knowledge information processing in which information such as an instruction given by a human being, expressed by a natural language, can be formed into a sentence or text stating the content of the instruction with minimal human aid.

2. Description of the Prior Art

Daily living problems encountered in daily life, such as problems concerning child care, cooking, laundry and so forth, are overcome by knowledge derived from, for example, books, telephone counseling, data retrieval by a computer and so forth. The best way of obtaining a solution, however, is to ask an expert or someone who has abundant experience.

Information derived from various sources has its own shortcomings. Books or the like include too much information so that it is difficult to pick out the desired information. Telephone counseling involves the problem or the risk of invasion of privacy. In addition, the reply often fails to address the point in which the consulter is interested. It is therefore not overstating the case to say that a practical limit exists in obtaining information through manual labor.

On the other hand, in mechanical processing, i.e., retrieval by a computer, one encounters difficulty in selecting effective keywords from a thesaurus and, hence, is not suitable for ordinary users.

Thus, problems encounters in human daily living are intricate and involve much ambiguity. It is therefore difficult to cope with such problems.

One of the tasks that is difficult for a machine to perform is writing a text. Users are generally obliged to input most portions of the sentence to be output. In some cases, terms and phrases which are used frequently are registered and called up as required to reduce the load on the user who inputs the sentence.

Constructing a text, however, requires much labor and is quite time-consuming. The use of registered terms or phrases cannot significantly reduce the load on the user because the construction of the whole text in which these terms and phrases are to be incorporated still requires manual processing to be conducted by the user. In addition, sentences tends to become stiff due to use of the fixed terms and phrases, failing to meet a demand for adaptability to a variety of situations.

SUMMARY OF THE INVENTION

Accordingly, an object of the present invention is to provide an information processing system which enables users to easily obtain information useful for solving a problem, thereby overcoming the above-described shortcomings of the prior art.

Another object of the present invention is to provide an information processing system which enables users to easily obtain information useful for solving a problem and which is convenient for the user who operates the system, thereby overcoming the above-described shortcomings of the prior art.

Still another object of the present invention is to provide an information processing system which enables the user to input information such as a demand, an order, or a request in terms of a natural language ordinarily used by the user, so that the user can easily obtain information useful for the solution of a problem, thereby overcoming the above-described shortcomings of the prior art.

A further object of the present invention is to provide an information processing system which automatically constructs a text upon receipt of a small amount of information.

BRIEF DESCRIPTION OF THE DRAWINGS

FIG. 5A is an illustration of an example of the content of a general knowledge base GKB used in the text making apparatus as the first embodiment;

FIG. 5B is an illustration of an example of the content of a domain knowledge base DKB used in the text making apparatus as the first embodiment;

FIG. 5C is an illustration of an example of the content of a knowledge-base TKB which describes the construction of a text used in the composition forming apparatus as the first embodiment;

FIG. 5D is an illustration of an example of the content of an individual data base IDB used in the text making apparatus as the first embodiment;

FIGS. 7A and 7B are illustrations of the operation of the text making apparatus in response to a practical example input to the apparatus;

FIGS. 9A and 9B are illustrations of the contents of a general knowledge base GKB used in the advice system as the second embodiment;

FIGS. 9C to 9E are illustrations of examples of the content of a domain knowledge base DKB, a knowledge base TKB describing a text structure, and an individual data base IDB, respectively, used in the advice system as the second embodiment;

FIG. 11 is an illustration of the operation of the advice system as in response to a practical example of the input;

FIGS. 12A and 12B are a schematic illustration of the judgment and information in the advice system as the second embodiment;

FIG. 14 is an illustration of an example of the construction of a knowledge base used in a modification of the second embodiment; and FIG. 15 is an illustration of the operation of the modification employing the knowledge base of FIG. 14 in response to a practical example of the input.

DESCRIPTION OF THE PREFERRED EMBODIMENTS

A description will be provided of two preferred embodiments of the present invention of the information processing system of the present invention: namely, a text making apparatus as the first embodiment of the information processing system of the present invention, and an advice system as the second embodiment of the information processing system.

CONSTRUCTION OF HARDWARE

Figure 1:
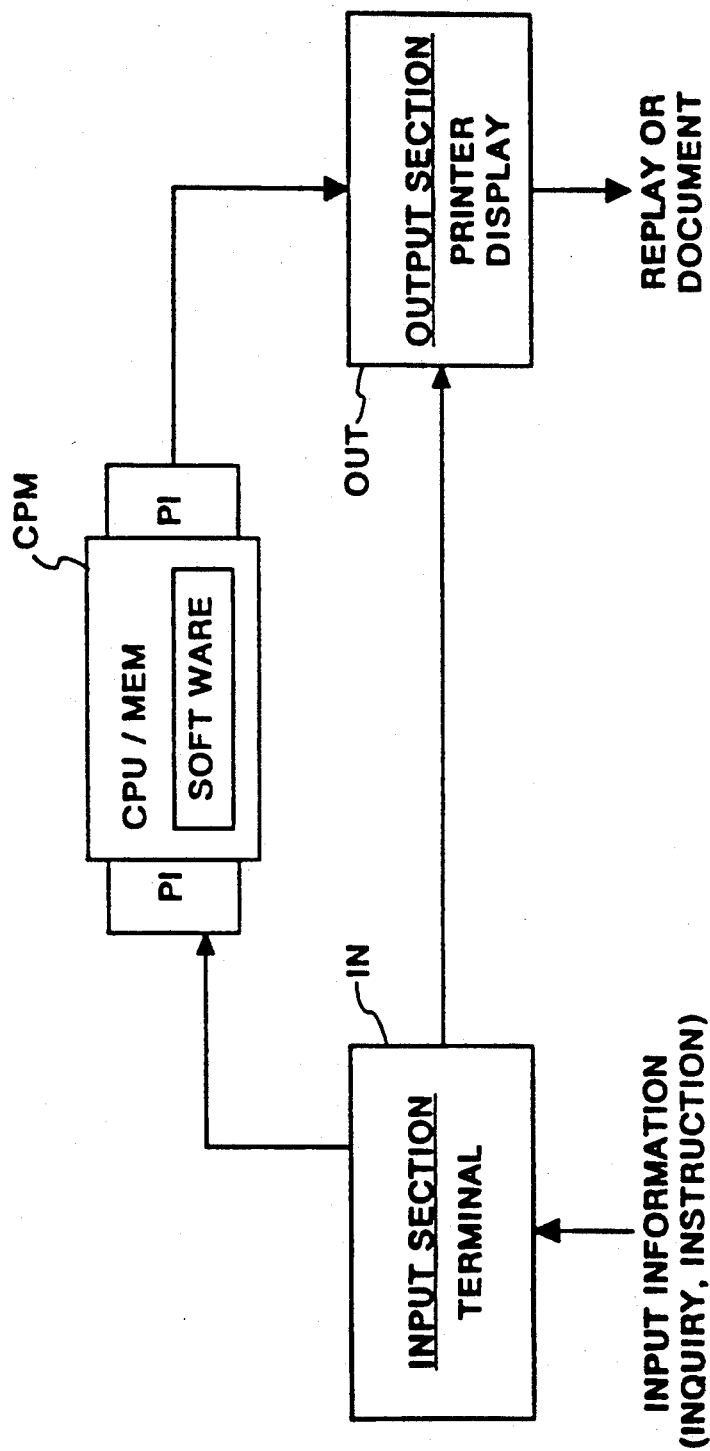
FIG. 1 is a block diagram of hardware common to two embodiments of the present invention.

FIG. 1 illustrates the construction of the hardware of the information processing system which is used commonly for the first and the second embodiments.

Referring to this figure, an input unit IN includes a keyboard or other type of input device such as a voice input device, a digitizer or the like. When a keyboard is used, the keyboard has character keys and function keys for enabling a user to input characters and symbols expressing information described by a natural language.

An output unit OUT has a display a printer and/or a voice synthesizer.

An information processing machine CPM has a processing unit CPU, a memory unit MEM and an input/output interface PI. The processing unit CPU processes, in accordance with a process stored in the memory unit MEM, information which is input through the input unit IN through the interface PI, and delivers the processed information through the interface PI in the form of a natural language. The information input through the input unit IN may be an "inquiry" requesting advice or it may be an "instruction" for constructing a text, expressed by a natural language ordinarily used by the user, e.g., English or Japanese. The output derived from the output unit OUT is an "answer" to the above-mentioned "inquiry" or an acceptable "text" formed in response to the above-mentioned "instruction".

The input information is input not only through the input unit IN. Namely, information derived from the memory unit MEM may be used as the input information provided that it is expressed in a natural language or in a language which is used in the processing machine.

TEXT FORMING SYSTEM (FIRST EMBODIMENT)

This system receives a text forming instruction which reads, for example, as follows:

"Write a letter to Smith about visiting Rochester after the OSA meeting in April"

The system which has received this instruction understands the intention and purpose to the user and, by making up any shortage through inference and/or a query to the user, forms the following text or business letter.

"We are working on a lens design system, using your theory of aberrations, and in this connection, would very much like an opportunity of discussing our system with you. Fortunately, it so happens that I shall be coming to the US to attend the OSA annual meeting to be held in April this year and I shall be obliged if I can come and visit you at Rochester, after the conference. Looking forward to hearing from you."

In the following description, the above-mentioned instruction "Write a letter to Smith . . . in April" will be referred to as "letter writing instruction input form".

Figure 2:
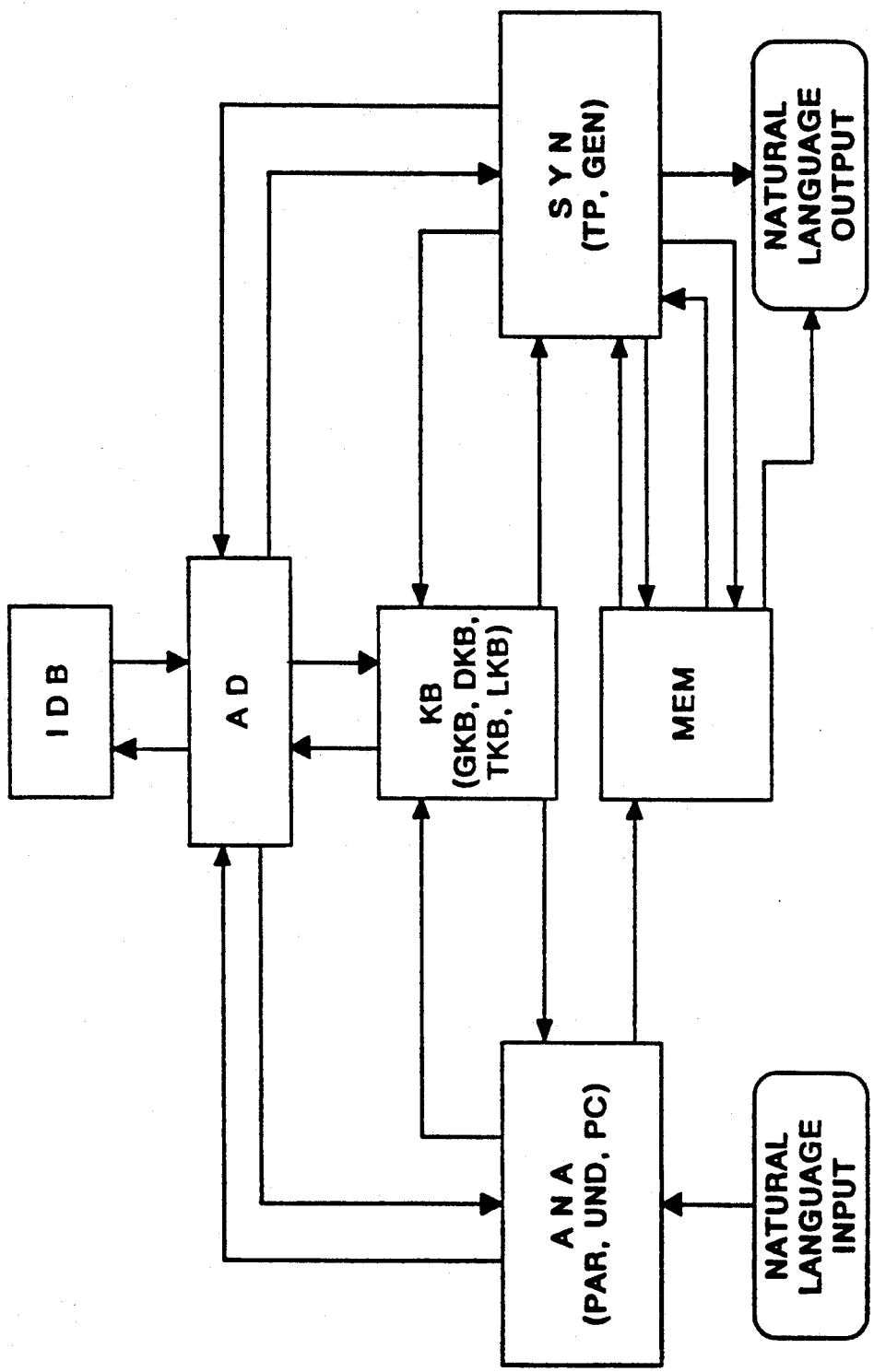
FIG. 2 is a block diagram showing the construction of an information processing machine CPM used in a text making apparatus as a first embodiment of the present invention.

FIG. 2 illustrates the composition of the information processing machine CPM, as well as the flow of data between components of the machine. As will be seen from this figure, the information processing machine CPM includes a natural language analyzer (sometimes abbreviated as "ANA" hereinafter), a natural language synthesizer (sometimes abbreviated as "SYN" hereinafter), a knowledge base (sometimes abbreviated as "KB" hereinafter), and an individual data base (sometimes abbreviated as "IDB" hereinafter).

The KB includes a general knowledge base (abbreviated as "GKB" hereinafter) shown in FIG. 5A storing data concerning general concepts, a domain knowledge base (sometimes abbreviated as "DKB" hereinafter) shown in FIG. 5B concerning domain-based concepts, a text knowledge base (sometimes abbreviated as "TKB" hereinafter) shown in FIG. 5C concerning concepts of text shown in FIG. 5C, and a linguistic knowledge base (sometimes abbreviated as "LKB" hereinafter) containing a dictionary and grammatical knowledge.

The individual data base IDB contains information concerning individuals such as the user (USER), each of the members of the user's family, and other specific persons.

Figure 3:
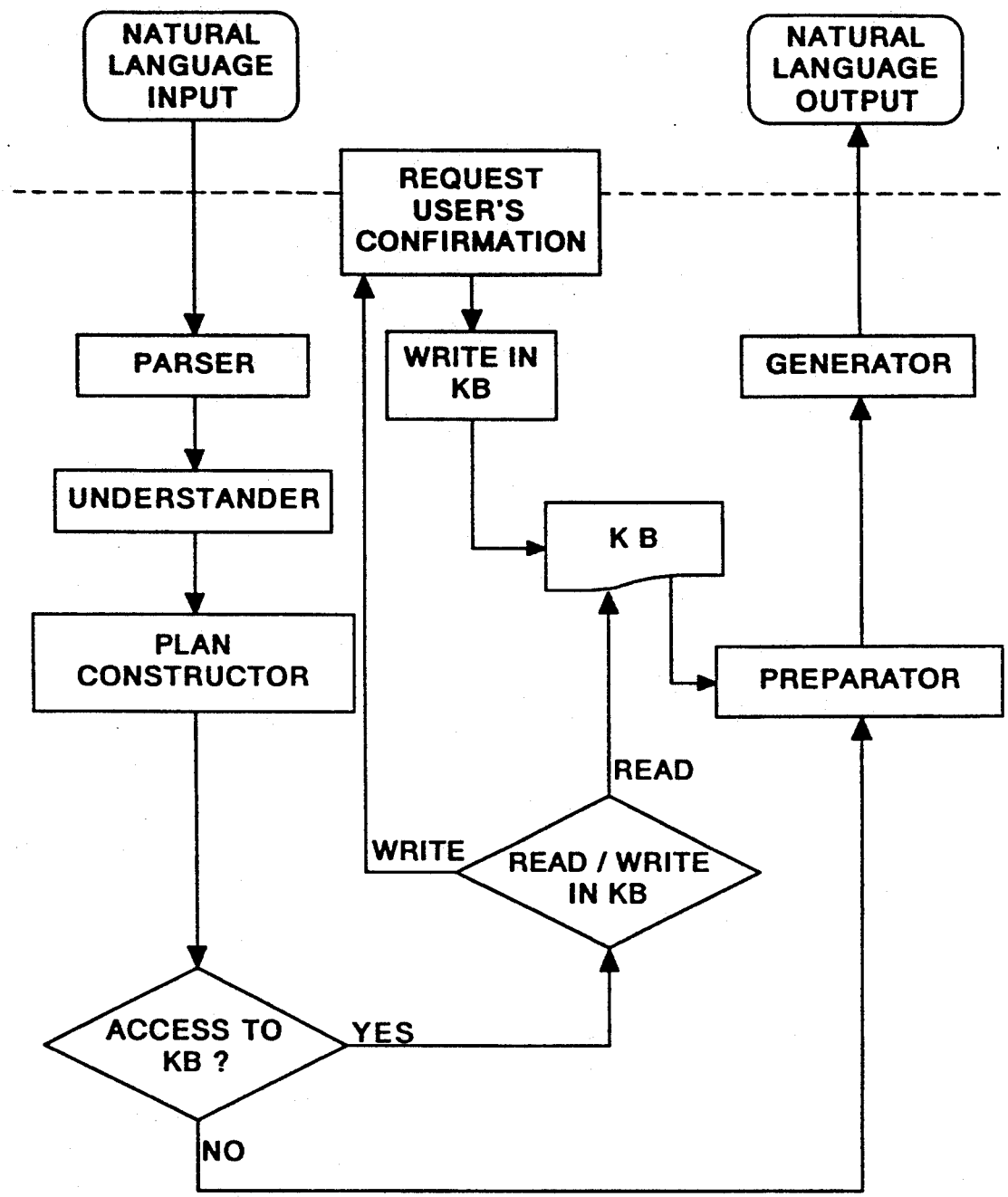
FIG. 3 is a schematic illustration of the flow of judgment and information in the text making apparatus as the first embodiment.

FIG. 3 shows the flow of data and inference results in the system in more detail than in FIG. 2.

Figure 4A:
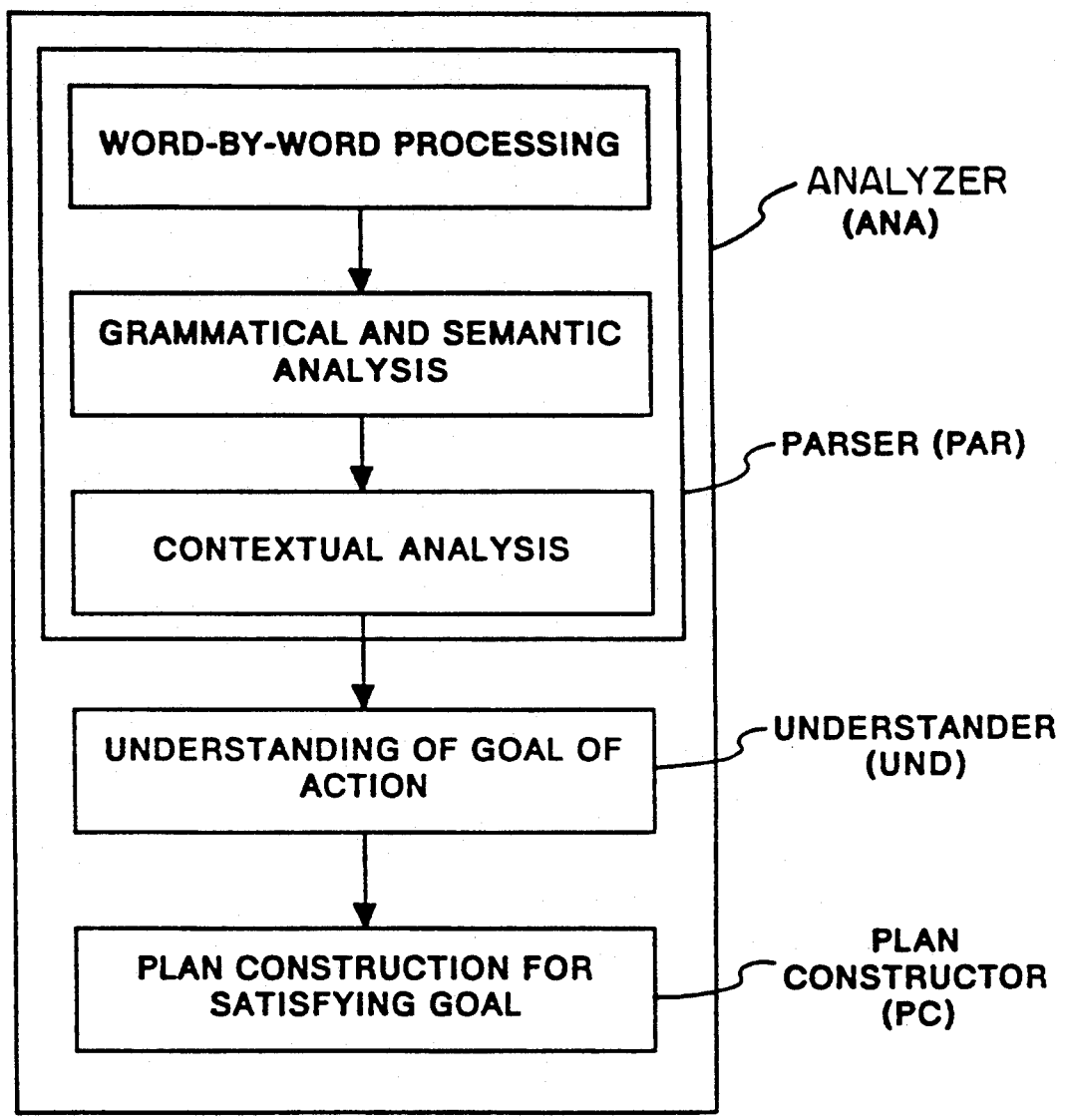
FIG. 4A is an illustration of a processing flow conducted in an analyzer ANA which is common to first and second embodiments of the present invention.
Figure 4B:
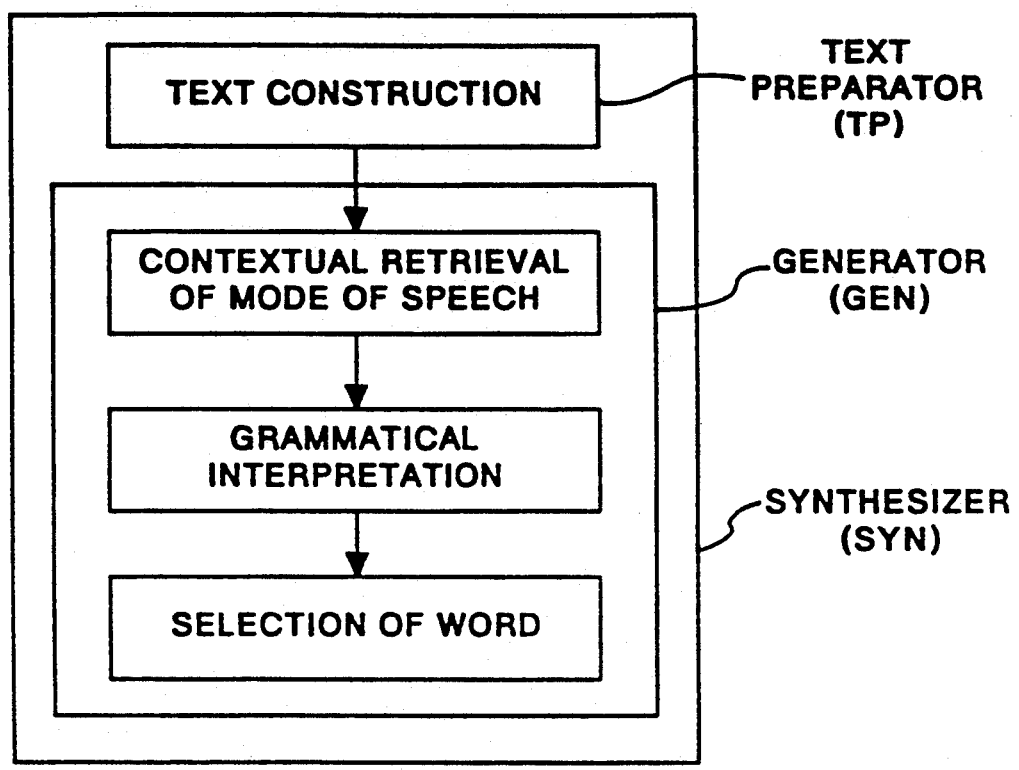
FIG. 4B is an illustration of a processing flow conducted in a synthesizer which is common to the first and second embodiments.

FIGS. 4A and 4B illustrate, respectively, the construction of the natural language analyzer ANA and the natural language synthesizer SYN.

Referring to FIG. 4A, the natural language analyzer ANA includes a parser (sometimes abbreviated as "PAR", hereinafter) which performs grammatical analysis, an understander (sometimes abbreviated as "UND" hereinafter) which understands the analyzed input statement so as to infer the user's intention, and a plan constructor (sometimes abbreviated as "PC" hereinafter) which constructs a plan in accordance with the intention.

Referring now to FIG. 4B, the synthesizer SYN has a text preparator (sometimes abbreviated as "TP" hereinafter) for preparing a text, and a generator (sometimes abbreviated as "GEN", hereinafter) which generates a natural language corresponding to the prepared text.

Referring again to FIG. 2, the described components of the text making apparatus function in relation to one another in a manner which will be described hereinafter.

The natural language analyzer ANA having the parser PAR and the understander UND infers the user's intention, sets up a command or goal, and works out a plan for achieving the goal, with the aid of the knowledge bases GKB, DKB and LKB.

In the course of the goal searching/plan constructing operation, the analyzer ANA has an inter-action with an administrator (sometimes abbreviated as "AD" hereinafter) in order to request a data service by the individual data base IDB.

The administrator AD is an administrating portion of the system which retrieves the individual data base IDB to find specific information or writes new information in the individual data base IDB, thus meeting demands by the natural language analyzer ANA and the natural language synthesizer SYN.

The aforementioned knowledge data base KB can be accessed by the natural language analyzer ANA, the administrator AD and the natural language synthesizer SYN.

Upon receipt of the result of the analysis performed by the natural language analyzer ANA coming from the memory MEM, the natural language synthesizer SYN operates using knowledge derived from the general knowledge base GKB, the domain knowledge base DKB and the linguistic knowledge base LKB, so as to synthesize components of a text in accordance with the text knowledge base TKB, thereby constructing a text of a natural language and sending the same to the output unit.

The memory unit MEM stores, for example, the results of the analysis performed by the natural language analyzer ANA, lists and output texts.

The operation of the whole system is as follows, and is illustrated in FIGS. 3, 4A, 4B, 5A, 5B, and 5C.

The natural language input received through the input unit IN is delivered to the natural language analyzer which has the parser PAR, understander UND and the plan constructor PC.

The processing performed by the analyzer ANA will be outlined. As shown in FIG. 4A, the parser PAR performs analysis by using knowledge from the linguistic knowledge base LKB of word concepts containing knowledge of an ordinary dictionary and grammatical knowledge. The analysis is conducted in steps in such a manner as to follow the context of the input statement first on a word-by-word basis and then on a clause-by-clause basis. In this operation, the parser PAR decomposes the input sentence into concept units while making up, if necessary, information which may have been omitted or which is not definitely given, so that the natural language sentence is converted into a program language of the system. The accuracy of the analysis is enhanced when it is conducted contextually, i.e., by taking into consideration the previously input sentence or sentences.

Subsequently, the understander UND searches through the concept units formed by the parser PAR for an actor or actors who are the subject or object of an action, using knowledge from the general knowledge base GKB, the domain knowledge data base DKB" concerning the domain-based concepts, and the individual data base IDB. For instance, in case of the business letter mentioned before, the actor is the person who inputted the information, i.e., the sender who sent the information to the system, and Mr. Smith. After identification of the actor or actors, an operation is started for understanding (deducing) the goals of the actions of the actor or actors and/or the plan for achieving such goal or goals. The goals and the plans and, in some cases even the actor, are not definitely determined by the input information. In such a case, an "inference" is conducted in the course of the analysis in which a goal and the plan concerning the actor are selected from the concept units acquired by the parser.

The understander UND may fail to obtain any plan for achieving one or more of the goals of the user as deduced by the understander UND. A plan or plans for achieving such goal or goals are constructed by the plan constructor PC. This can be done by retrieving the domain knowledge base DKB (see FIG. 5B).

For instance, assuming here that the goal is "Get Information", the plan is, for example, "Request Information from appropriate person".

After completion of this operation, the user can request the display or the printer to show the thus constructed plan, so that the user can see the output plan to evaluate the "degree of understanding", i.e., to what degree the system has understood the user's intention. If necessary, the user can amend the outputted plan or to make a supplementation plan, so that the plan after amendment or supplementation is used as the plan to be processed in a subsequent step of the process. The system then writes the plan after amendment or supplementation in a domain knowledge base DKB together with the goals, and learns this plan. The steps of confirmation by the user and updating of the content of the DKB are shown in FIG. 3.

The information thus obtained by the analyzer ANA is sent to the synthesizer SYN. The synthesizer SYN, which is composed of the text preparator TP and a generator GEN, operates in a manner which will be described with specific reference to FIG. 4B.

As the first step, the information obtained through the analyzer ANA is put by the text preparator TP in accordance with the knowledge of the text knowledge base TKB (see FIG. 5C) containing concepts of formation of a text. In this step, information also is derived which is necessary for adapting the information acquired through the analyzer ANA to a text forming concept stored in the text knowledge base TKB, from the text knowledge base TKB itself, the general knowledge base GKB, the domain knowledge base DKB of domain-based concepts, and the individual data base IDB.

The "components" of the text put in order are then sent to the text generator GEN which selects modes of speech such as the form of the text e.g., an inquiry, a request and so forth, degree of politeness, etc. The text generator GEN selects words which match the selected mode, in accordance with grammatical rules and making use of knowledge derived from the general knowledge base GKB and the linguistic knowledge base LKB concerning the word concepts, thereby converting the text of the programming language into a text of a natural language.

The thus formed text expressed by the natural language is displayed on the display or printed out by the printer so as to be presented to the user. The user can amend or make supplementation as necessitated also in this step, and the resultant information is written in the knowledge base KB. The final result is then outputted, thus completing the operation.

Figure 6A:
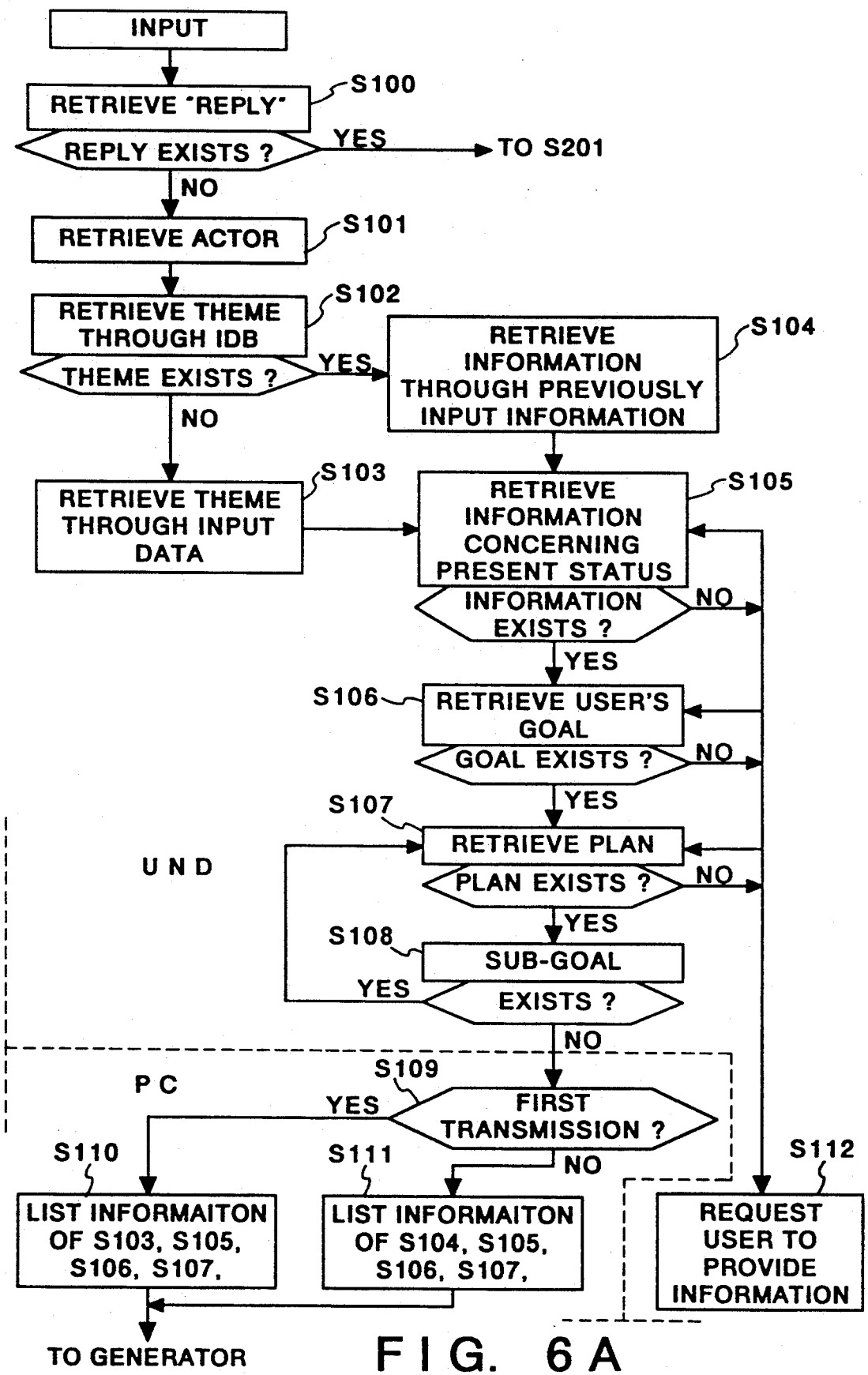
FIGS. 6A and 6B are flow charts illustrating the operations performed by the analyzer ANA and a text preparator TP in the text making apparatus as the first embodiment.
Figure 6B:
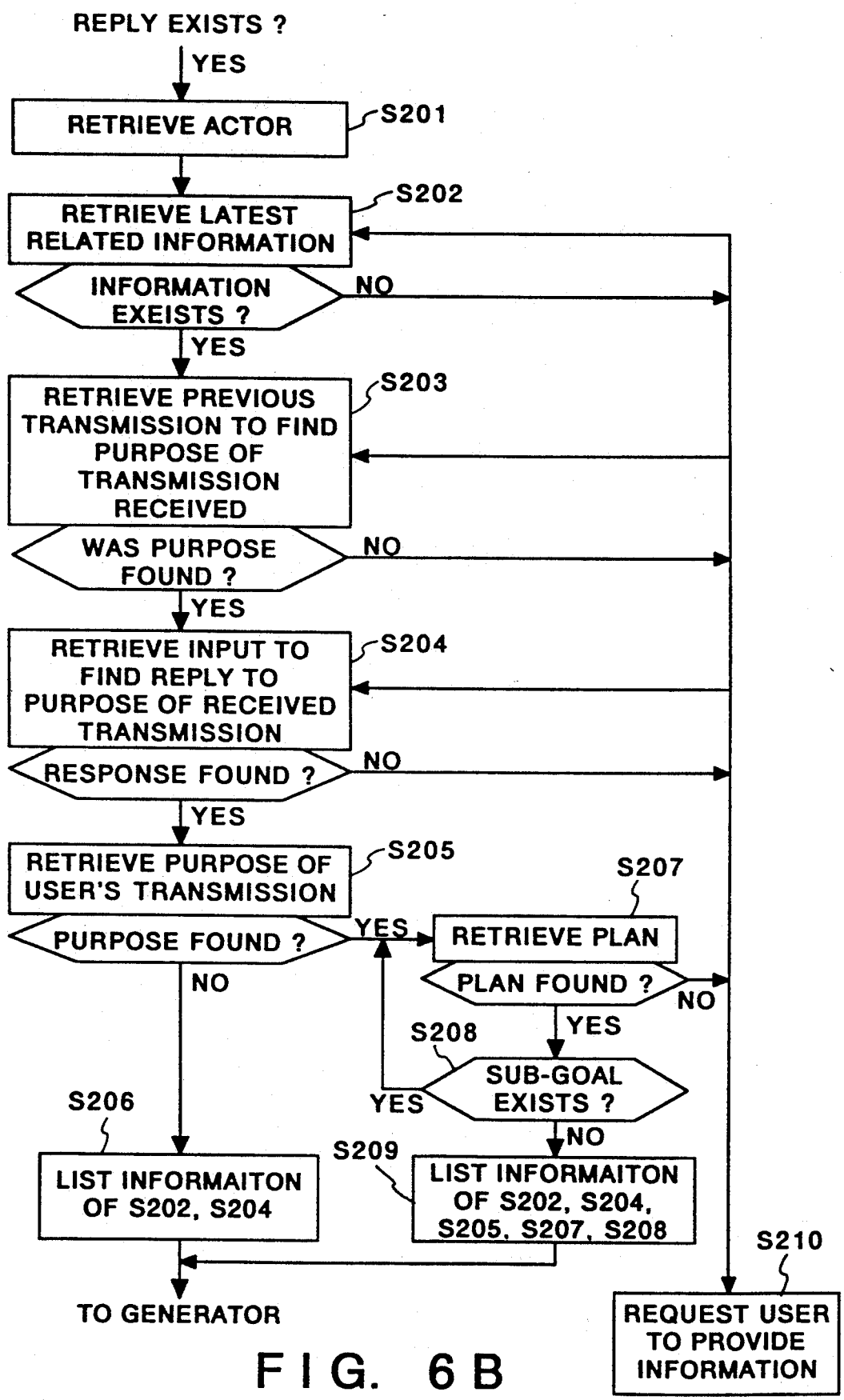

A description will be provided as to the processes executed by the natural language analyzer ANA and the text preparator TP when the aforementioned business letter of English language is formed by the text making apparatus, with specific reference to FIGS. 6A and 6B.

Referring to FIG. 6A, the parser PAR retrieves the input information to find a word "reply" upon receipt of an input from a user in Step S100. This is for checking whether the text or letter to be formed is a response to a letter sent from the person to which the letter is to be sent. In the illustrated case, the word "reply" is not found so that the input information is regarded as being a novel demand for transmittal of a letter. The process then proceeds to Step S101.

Steps S101 to S108 are the steps which are executed by the understander UND. In Step S101, the understander UND retrieves the input information to find actors. The actors in the aforementioned "letter writing instruction input form" are the user and Mr. Smith. In Step S102, theme concerning each actor found in Step S101 is retrieved from the individual data base IDB. It is understood that, in the case of the aforementioned "letter writing instruction input form", the theme common to the user and Mr Smith is "Theory of Aberrations". Retrieving the theme is conducted at a simple level of retrieval using keywords.

If the theme is found, the process proceeds to Step S104 in which the understander UND retrieves all the information input in the past to search for information which relates to the presently input information. The process proceeds to Step S105.

On the other hand, if no theme is found through retrieval of the individual data base IDB in Step S102, the process proceeds to Step S103 and the theme is retrieved from the input information itself. The process then proceeds to Step S105.

In Step S105, information concerning the present state is obtained by an inference from the input information or through retrieval of the knowledge bases. In the case of the "letter writing instruction input form", the "information concerning present state" includes, for example, various kinds of information such as "Smith is a professor of Univ. of Rochester.", "Sender is working on a lens design system.", "Smith's theory of aberrations is used for sender's system.", and so forth. If no information concerning present state is obtained in Step S105, the process proceeds to Step S112 in which the user is requested to furnish information.

If the information concerning the present state is obtained, the process proceeds to Step S106 in which the user's goal is selected through a retrieval or inference. In case of the above-mentioned "letter writing instruction input form", the user's goal is "getting information by discussing with Smith". When no goal is found in Step S106, the process proceeds to Step S112 in which a request is given to the user for further information.

When the goal is found, the understander UND retrieves the input information and the knowledge bases KB, in particular the domain knowledge base DKB, as well as the individual data base IDB, to search for a plan corresponding to the goal. If the goal is obtained, the understander UND retrieves a sub-goal which is subordinate to the aforementioned goal (main goal) in Step S108. This is done because, in some cases, the main goal is reached through a sub-goal or sub-goals. If Step S107 fails to find a plan which would correspond to the goal found in Step S106, the process proceeds to Step S112 in which the user is requested to furnish further information.

If a sub-goal is detected in Step S108, the process returns to Step S107 in which the knowledge bases including the domain knowledge base DKB is retrieved for the purpose of searching for a plan corresponding to the sub-goal. Sections F to I of FIG. 7A illustrate a practical example of the operation for searching for the sub-goal and the plan corresponding to the sub-goal.

The plan constructor PC executes a process which includes Steps S109 to S111.

When all the goals have been found in Steps down to Step S108, the process proceeds to Step S109 in which the plan constructor PC determines whether the "letter writing instruction input" is the instruction for a letter to be transmitted voluntarily. More specifically, the plan constructor PC determines this instruction as being an instruction for a voluntary letter, on condition that no theme could be searched out through retrieval in the individual database IDB conducted in Step S102. When the instruction is a voluntary instruction, the process proceeds to Step S110 in which various kinds of information obtained in Steps S103, S105, S106 and S107 are listed in the memory MEM. However, if the instruction is not for a voluntary letter, the process proceeds to Step S111 in which various kinds of information obtained in Steps S104, S105, S106 and S107 are listed in the memory MEM and are sent to the generator. The operations in Steps S110 and S111 are conducted because, if the "letter writing instruction input" is an instruction for a voluntary letter, there should be a theme obtained through inference from the input statement conducted in Step S103 and, if not, there should be information obtained in Step S104 relating to previously input information.

When the term "reply" is found in Step S100 in the instruction input statement, the operation is as follows. The fact that the term "reply" was found means that the present instruction input is a "reply instruction input" for writing a letter in reply to a letter received previously. In this case, the process proceeds to Step S201 of the process shown in FIG. 6B in which retrieval of actors is conducted in the reply instruction input in Step S102, as in the case of Step S101. In Step S202, the latest information concerning the reply instruction input is retrieved. The "information concerning the reply instruction input" means a previous letter from the correspondent, a user's letter sent to the correspondent in reply to the above mentioned letter, and so forth. After the latest information is obtained, the process proceeds to Step S203 which conducts retrieval of the individual data base IDB to search for the transmission to the correspondent. If such transmission to the correspondent is found, a retrieval is conducted to detect the purpose of this letter, i.e., the intention of the correspondent's letter which was transmitted in response to the previous letter from the user. The previous letter from the user to the correspondent was formed by this system and, therefore, is stored in this system. The purpose of the letter from the correspondent, therefore, can be inferred through retrieval of the record of transmission to find any portion requesting an answer from the correspondent, and this portion is inferred as being the goal or purpose of the letter from the correspondent.

When such intention is found, the process proceeds to Step S204 in which the input information is retrieved to find the user's reply to be sent in response to the correspondent's intention found in Step S203.

When the user's reply is found, the process proceeds to Step S205. However, if no information could be obtained throughout the steps S202, S203 and S204, the process proceeds to Step S210 in which the user is requested to furnish information and, when such information is obtained from the user, the process proceeds to a next step.

In Step S205, any purpose of the user's transmission other than the "response" is retrieved in the reply instruction input. If no other purpose is detected, the process proceeds to Step S206. Conversely, if there is any other purpose, the process proceeds to Step S207. Step S207 constructs a plan for attaining the goal, as is the case of Step S107. If a sub-goal is found in Step S208 as in Step S108, a plan for attaining such a sub-goal is produced in Step S208. The process then proceeds to Step S209.

In Step S206, the information obtained in Step S202 and the information obtained in Step S204 are listed, while, in Step S209, the pieces of information obtained in Steps S202, S204, S205, S207 and S208 are listed. The lists of information obtained in Step S206 or Step S209 is sent to the generator GEN.

Figure 7B:
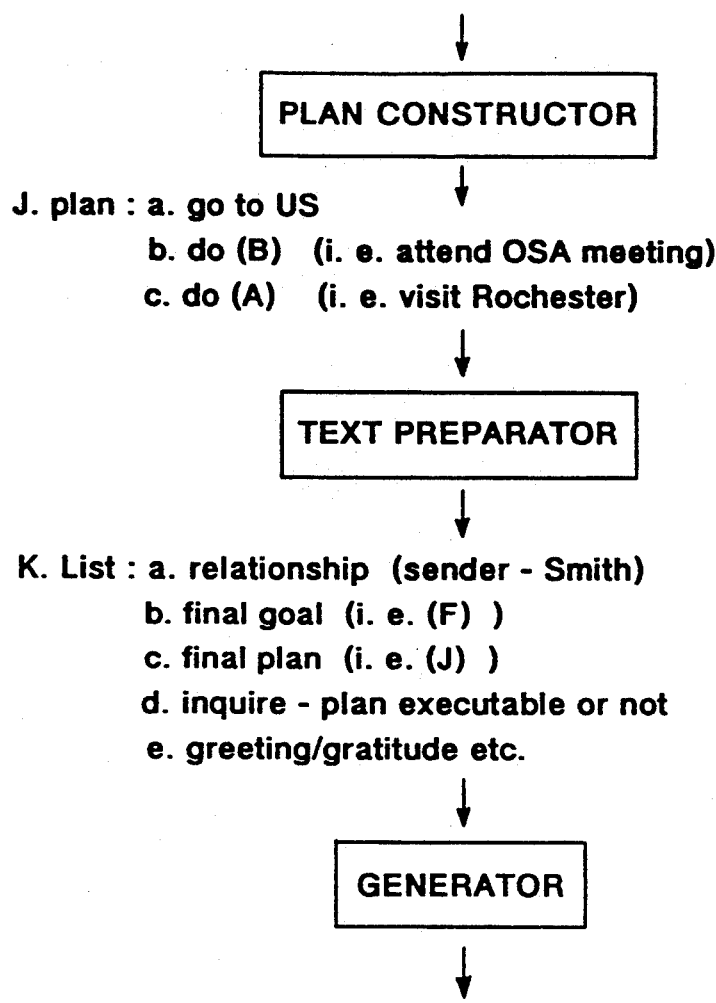

A detailed description will be provided of the process for writing a letter in response to the "LETTER WRITING INSTRUCTION INPUT", with reference to FIGS. 7A and 7B.

The aforementioned statement shown in FIG. 7A, reading "Write a letter to Smith about visiting Rochester after the OSA meeting in April" is exemplarily used as the input.

Upon receipt of this input information, the parser PAR determines, from the knowledge derived from the general knowledge base GKB, that the subject of a verb (or phrase) which is not clearly shown in the input statement is the sender, i.e., the user in this case and that the phrase "after the OSA meeting" means "after attending the OSA meeting", thus filling up vacancy of information.

Then, the input information is divided into concept units. In the parser PAR, the following pieces of information are finally obtained.

U *. sender-write-to-Smith
A. sender-go to-Rochester-April
B. sender-go to-OSA meeting-April
C. A occurs after B Subsequently, the understander UND retrieves the actor so that the sender and Smith are selected as the actors. This retrieval for identifying the actors corresponds to Step S101 of the flow shown in FIG. 6A. After the identification of the actors, retrieval of a theme is conducted in the individual data base IDB (Step S102). As stated before, the individual database IDB (see FIG. 5D) stores "theory of Aberration" as the common keyword, so that the process proceeds from Step S104 to Step S105, whereby related previous information and the information concerning the present state are obtained. In the course of this retrieval, information is derived from the individual data base IDB and also from the user if necessary, so as to enable inference of the item D shown in FIG. 7A.

D-i. Smith is a professor of Univ. of Rochester
D-ii As sender-Smith relationship
Sender is working on a lens design system. Smith's theory of aberration is used for sender's system.

The following information is derived from the general knowledge base GKB.

D-iii. OSA meeting is OSA annual meeting which will be held in US.

Using these pieces of information concerning the present state, the following item E is obtained as the user's goal in Step S106.

E. sender-has-goal of-A and B

Step S106 also retrieves whether there is any goal of a higher order. Namely, the understander UND understands from the knowledge of DKB (see FIG. 5B) that the user's ACTION to visit a city of Rochester where University of Rochester in which Mr. Smith works as a professor is located is derived from a plan "Visit a Person" or a plan "Visit appropriate person and discuss etc." Since the plan visit appropriate person and discuss" is included in the plan of goal of "Get Information", the following item F is obtained as a higher-order goal of the aforementioned goal A.

F. sender-has-goal-of-getting information by discussing with Smith

Subsequently, a retrieval is conducted to find a plan for attaining the goal F (Step S107 in FIG. 6A). In this state, the goal A is regarded as being a plan for the goal F. At the same time, the following item G is derived from the aforementioned item D-i, as a sub-goal subordinate to the item A.

G. plan-for goal F: go to Rochester (Univ. of Rochester) go to US

The following item H is obtained from the item Diii as the plan for the goal B.

H. plan-for goal B: go to US

Using these items, a plan for the goals A and B is obtained as follows.

I. plan-for goals A and B: go to US

These operations correspond to Steps S107 and S108. The operation of the understander UND is thus completed.

Subsequently, a plan for actual action is constructed by the plan constructor C as follows.

J. plan:
  a. go to US
  b. do B (i.e., attend OSA meeting)
  c. do A (i.e., visit Rochester)

From the foregoing inference, the text preparator TP obtains the following items as information.

a. relationship (sender-Smith)
  b. final goal (i.e. F)
  c. final plan (i.e. J)

Then, from the list of "purpose of the letter" in the text knowledge base TKB (see FIG. SC), it is understood that the purpose of the letter to be written is an expectation from the person to whom the letter is written, and the following item is added in view of the goal "visit a person"

d. inquire-plan executable or not.

At the same time, rhetorical expressions to be put at the beginning and end of a letter are derived from the text knowledge base TKB as follows.

e greetings/gratitude, etc

These pieces of information, with addition of the rhetorical expressions, are arranged as follows.

Dear Prof. Smith (greeting)
sender is working on a lens system (sender-Smith relation)

Smith's theory of aberration is used for sender's system (sender-Smith relation)
sender-has-goal of-discussing with Smith (final goal)
sender-go to-US (final plan)
attend OSA meeting (final plan)
visit Rochester (after the meeting) (final plan)
sender -can-visit-or not? (inquire-plan executable or not)
Looking forward to hearing from you (greeting)
Yours sincerely (greeting)

Finally, the generator transforms the text components obtained by the text preparator TP as shown above into natural language, using knowledge derived from the basic linguistic concept knowledge base LKB and taking into account the aforementioned mode of speech.

Consequently, the display or the printer outputs a letter as indicated by OUTPUT in FIG. 7B.

As has been described, the text making apparatus as the first embodiment of the present invention can automatically construct, upon receipt of a minimal or small amount of information input in the form of a natural language, an adequate text by retrieving the purpose or goal of the text and by adding various kinds of information concerning the plan and action from data bases.

ADVICE SYSTEM (SECOND EMBODIMENT)

An advice system embodying the present invention employs the hardware having the construction as shown in FIG. 1.

Figure 8:
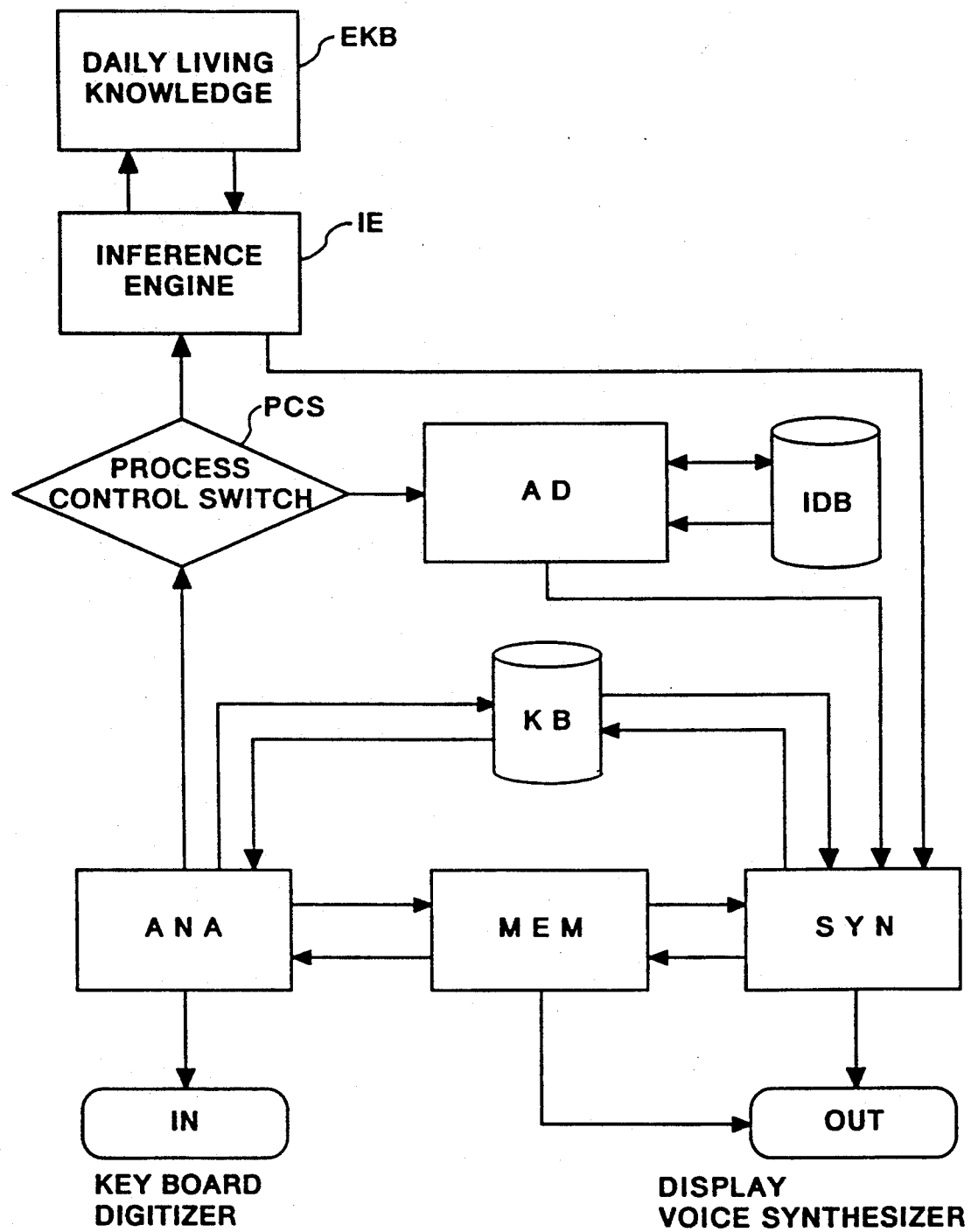
FIG. 8 is a block diagram of an advice system as a second embodiment of the present invention.

FIG. 8 is a block diagram of the CPM portion of the advice system as the second embodiment. In this figure, the same notations are used to denote the components having similar functions as those shown in FIG. 3 which is a block diagram of the first embodiment. However, it is to be noted that, since the first embodiment is directed to a text generating apparatus while the second embodiment is directed to an advice system, the contents of the components expressed by the same name, e.g., knowledge bases KB, of the second embodiment are different from those in the first embodiment. It is also understood that the system shown in FIG. 8 is different from that shown in FIG. 3 in that it has an inference engine IE backed up by an expert knowledge system EKB. This is because the advice system as the second embodiment requires a high degree of inference which cannot be performed by the analyzer ANA and the synthesizer SYN used in the first embodiment. However, if the domain concerned does not require such a high degree of inference, the expert system EKB and the inference engine IE for such a domain may be omitted.

Referring to FIG. 8, the CPM has a natural language analyzer (sometimes abbreviated as "ANA"), a natural language synthesizer (sometimes abbreviated as "SYN"), a knowledge base (sometimes abbreviated as "KB"), a data base (sometimes abbreviated as "DB"), an inference engine (sometimes abbreviated as "IE"), and an expert knowledge base (sometimes abbreviated as "EKB").

The flows of logic in the analyzer ANA and the synthesizer SYN in the second embodiment are materially the same as those of the first embodiment so that detailed description thereof is omitted in this connection.

The knowledge base KB, individual database IDB and the expert knowledge base EKB shown in FIG. 8 will be described hereinunder.

The knowledge base KB includes a general knowledge base shown in FIGS. 9A and 9B (sometimes abbreviated as "GKB") containing knowledge of general concepts, a domain knowledge base (sometimes abbreviated as "DKB") shown in FIG. 9C containing knowledge concerning domain-based concepts, a text knowledge base (sometimes abbreviated as "TKB") shown in FIG. 9D containing knowledge concerning formation of a text, and a linguistic knowledge base (sometimes abbreviated as "LKB") containing knowledge of an ordinary dictionary and grammar. The portion of the general knowledge GKB shown in FIG. 9A contains nouns, while the portion shown in FIG. 9B contains knowledge of verbs and, in addition, adjectives and adverbs. The text knowledge base TKB used in this embodiment may be substantially the same as that (see FIG. 5C) of the first embodiment, for the following reason. Namely, both the text making apparatus as the first embodiment and the advice system as the second embodiment process a natural language of the same logical structure, although the second embodiment outputs an answer in the form of a conversation or dialogue while the first embodiment is designed to output a written text such as a latter. This is the reason why the same text knowledge base TKB can be used. The discrimination between the written text style used in the first embodiment and the spoken style used in the second embodiment is done by means of the "mode of speech" set by the generator GEN.

The individual data base IDB contains knowledge concerning individuals such as the user, each of members of the user's family and other specific persons, as shown in FIG. 9E.

Figure 10:
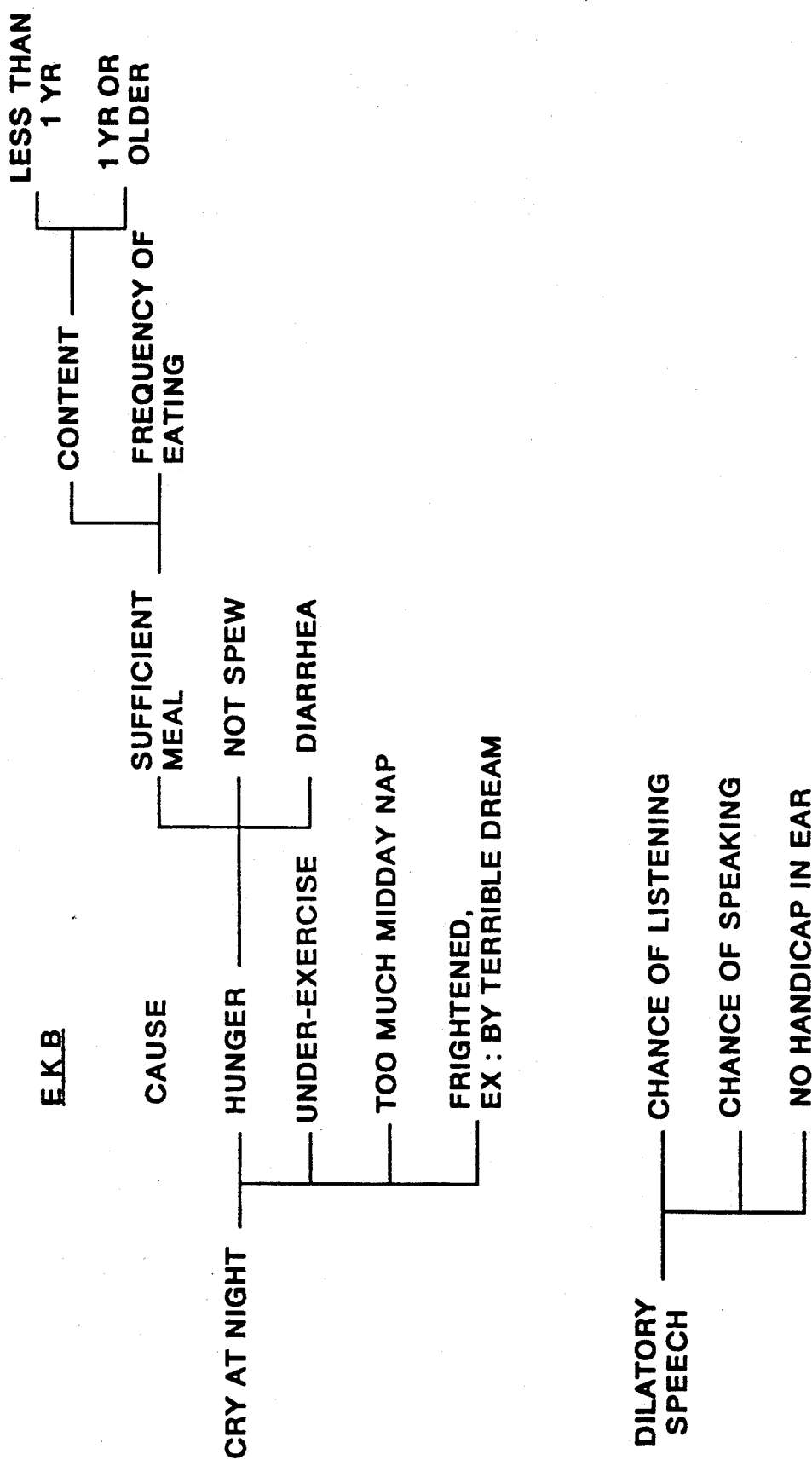
FIG. 10 is an illustration of an example of an expert knowledge base EKB for the child care domain used in the advice system as the second embodiment.

The expert knowledge system EKB accessed by the inference engine IE has knowledge as shown in FIG. 10. The system shown in FIG. 8 is intended for embodying the invention as a system which provides an answer to a question concerning child care. Therefore, the FIG. 10 exemplarily show a part of knowledge concerning child care stored in the expert knowledge base EKB.

This advice system receives a "query" input by the user through a natural language as shown in FIG. 9 and produces and outputs an adequate answer through inference on the basis of various types of knowledge derived from the knowledge bases. If the input information is insufficient for enabling the system to produce an answer, the system poses a "counter question" to the user to request further information and inference is continued using the thus obtained supplementary information.

The operation of the advice as the second embodiment of the invention will be described with reference to FIG. 11.

A query information "SHE WON'T STOP CRYING AT NIGHT" is input to the system by the user. The system (parser PAR) understands the input query information on a word-by- word basis and, using knowledge of the child care knowledge base, processes the information on a clause-by-clause basis so as to analyze the context. Thus, the system (understander UND) recognizes that "CRYING AT NIGHT" is a symptoms which often occurs in infants, from the domain knowledge base DKB.

The system then infers the subject of the sentence which is not identified from the input query information, i.e., who is "SHE", and then concludes that the subject is a baby or an infant. Thus, the system recognizes that the user's baby does not stop crying at night.

The above-described operation suggests that the system infers the theme of the query from the input query information. The theme is "baby's crying at night".

The system conducts a further inference to find that the user, i.e., the mother, is upset by the crying at night, and determines that a goal for the initial input query information is to relieve her from the worry.

The system then constructs a plan to achieve the goal. The plan is constructed with reference to the child care expert knowledge base.

More specifically, the system recognizes that the cause of the previous night crying was "hunger", from the individual database IDB (see FIG. 9E) containing knowledge concerning the user's baby. The system therefore constructs a plan for obtaining further input information and converts the plan into the form of a natural language using expressions available in the system. Thus, a plan is constructed to pose a counter-question "LAST TIME IT WAS HUNGER, REMEMBER" and the system outputs this plan in the form of voice from the output unit OUT.

The user inputs an answer to the counter-question to the system so that the system utilizes this answer as a new information. It is assumed here that the user answered "WELL,SHE COULD BE HUNGRY" as shown in FIG. 11. The rather affirmative word "WELL" enables the system to confirm that the goal of "MAKING CLEAR THE CAUSE OF CRYING AT NIGHT" is correct. At the same time, the system understands that the user has not been completely satisfied, from the words "SHE COULD BE HUNGRY" which suggests that the user is still wondering whether the cause is actually hunger. This operation is conducted following the steps of the "ANALYSIS OF THEME" from the input query information, "DETERMINATION OF GOAL" and "PLAN CONSTRUCTION". Thus, the system poses a counter-question "MAKI TAKES MILK, DOESN'T SHE/ HOW OFTEN DO YOU FEED HER?".

The conversation is ceased when the answer of the user is inferred as being affirmative by the system. In case of the example shown in FIG. 11, the conversation is ceased when an affirmative answer "OK, I'LL TRY" is obtained.

Inter-action of the function units of the system will be described with reference to FIG. 8.

The natural language analyzer ANA infers the user's intention and works out a plan using knowledge derived from the knowledge bases such as GKB, DKB, TKB and LKB, and delivers the plan to a process control switch (sometimes referred to as "PCS"). As a preparatory step for executing the plan, the process control switch delivers the plan to the inference engine IE to request an advice or to the administrator AD for the purpose of obtaining data service from the individual data base IDB.

The operation of the whole system will be described with reference to FIGS. 4A, 4B and 11. The construction shown in FIG. 4 is used commonly both in the first and second embodiments. The input expressed in natural language is sent to the natural language analyzer which is composed of the parser PAR, understander UND and the plan constructor PC. As the first step of the process conducted in the natural language analyzer ANA, the parser PAR analyzes the input information by making use of various knowledge derived from the linguistic knowledge base LKB containing knowledge of or ordinary dictionary and grammar and the general knowledge base GKB containing knowledge of ordinary concepts. In this operation, the input sentence is decomposed into concept units, with an occasional supplementation of information to add any information which is not definitely stated or which is not identified from the input sentence. The components are then converted into the program language used in the system. This operation corresponds to Step S1 shown in FIG. 13. In the case of the example shown in FIG. 11, the step S1 infers that "CRYING AT NIGHT" is a symptom common to infants.

Figure 12B:
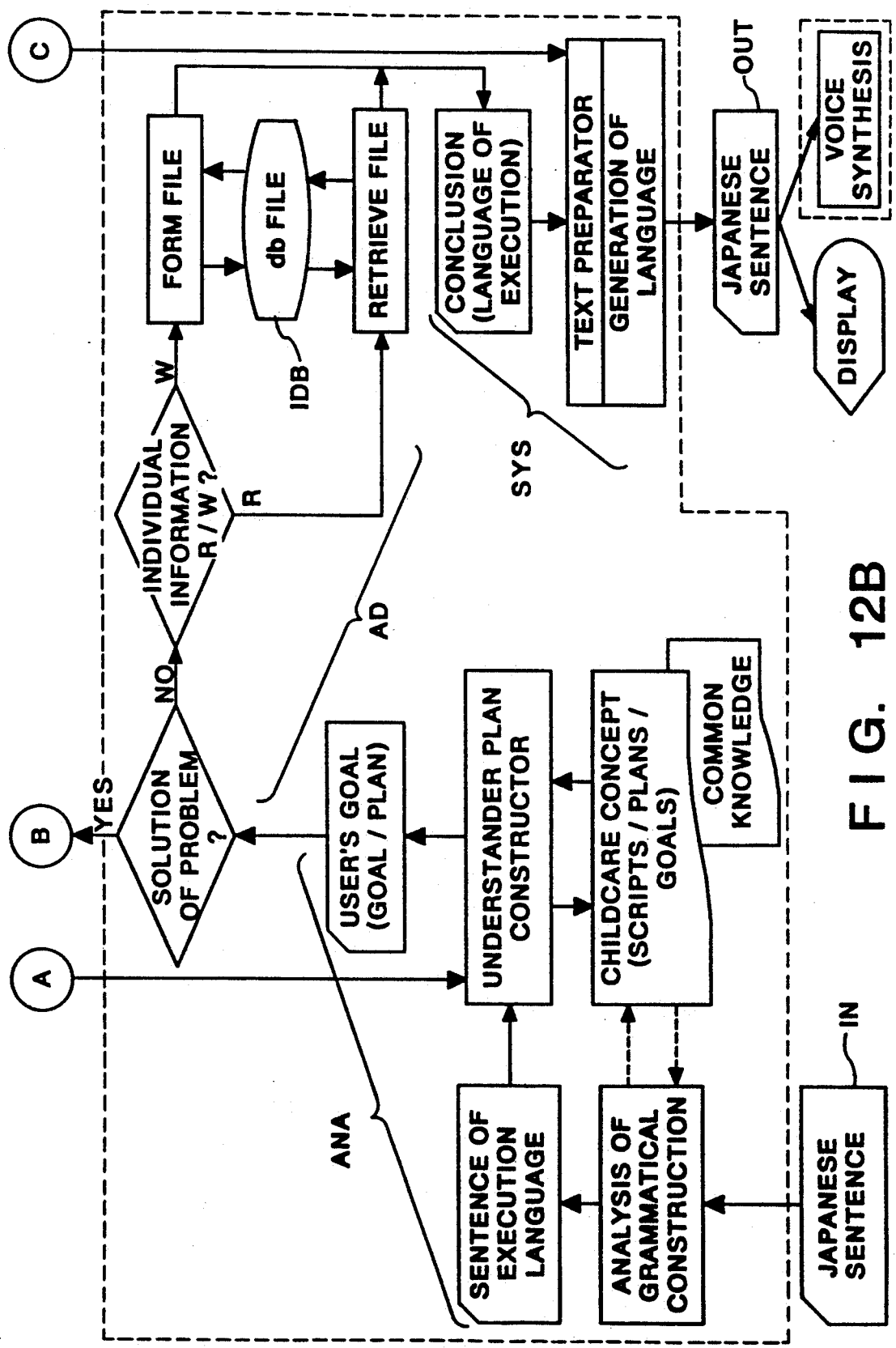

Thus, the PARSER analyzes the structure of the input sentence as shown in FIG. 12B. The result of the processing operation by the PARSER is:

"She—will not—stop—crying at night."

This is given to the UND in the form of an executable language sentence which is rewritten by a programming language. The understander then retrieves the concept units formed by the PARSER to find actors who are related to the action, e.g., the subject and object of the action, using knowledge derived from the general knowledge data base GKB, the domain knowledge base DKB and the individual data base IDB (Step S2 in FIG. 13). In the case of the example shown in FIG. 11, it is inferred that the actor is a "she" and actually a child of the user. Thus, the understander then retrieves the concept units formed by the parser to find actors who are related to the action, e.g., the subject and object of the action, using knowledge derived from the general knowledge base GKB, the domain knowledge base DKB and the individual database IDB (Step S2 in FIG. 13). In the case of the example shown in FIG. 11, the system infers that the actor is a baby.

After finding the actor, the system starts to understand (retrieve) the goal and/or plan of the action related to the actor. In case of the example shown in FIG. 11, the system (understander UND) infers in Step S3 a situation that the baby abnormally continues to cry at night and that this is a source of worry for the mother. In Step S4, the system combines the inferred situation with the theme. In Step S6, the system infers a goal "relieving the mother from the situation" using knowledge from the domain knowledge base DKB (see FIG. 9C). In the case of the example shown in FIG. 11, it is assumed that the theme is "HEALTH" with respect to the situation "CRYING AT NIGHT". Goals such as "TO FEED TO AVOID HUNGER", "TO AVERT FROM DISEASES". "TO DO EXERCISE" are listed as a result of the combination of this theme and situation. These goals are sent to the plan constructor PC.

Figure 13:
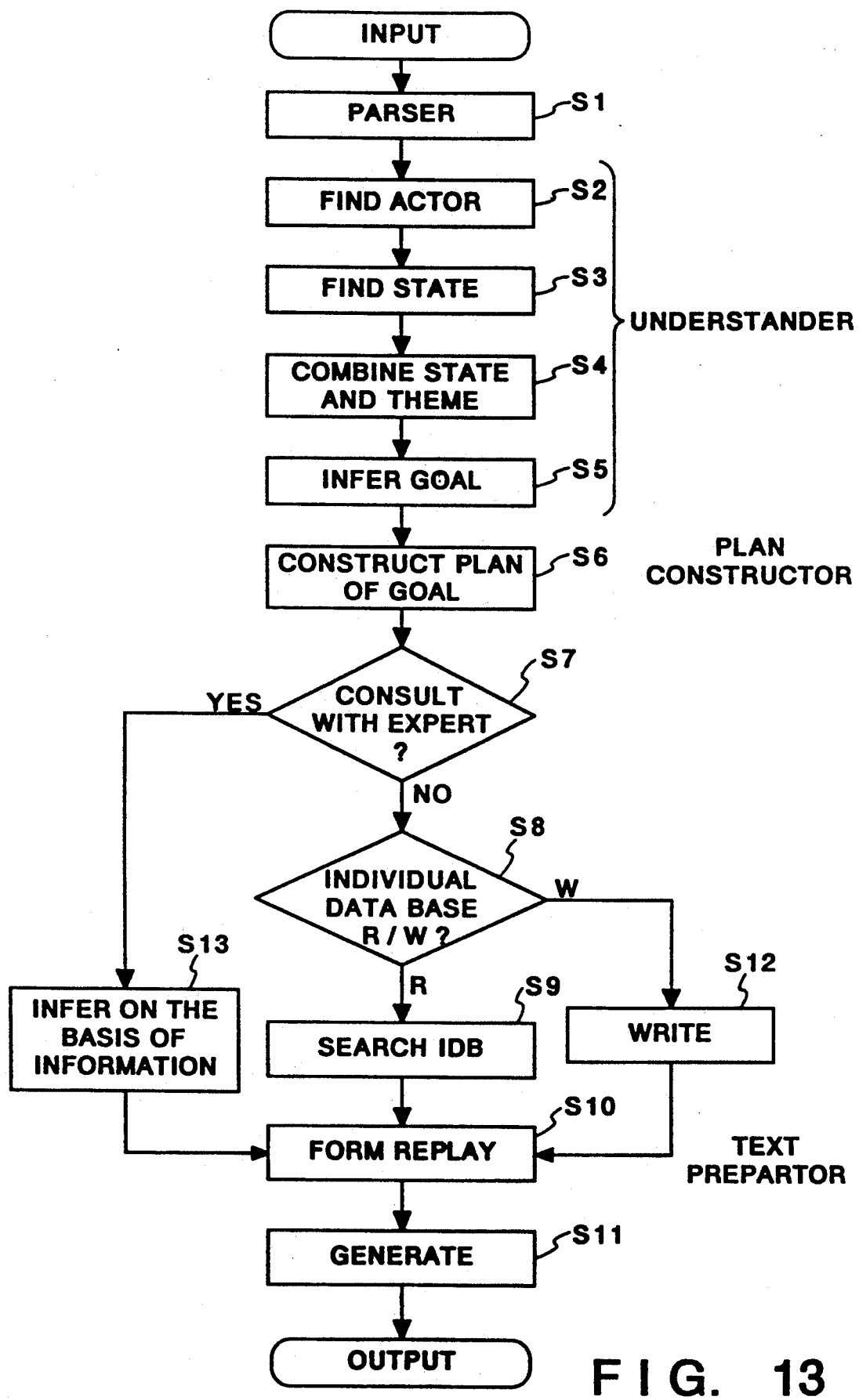
FIG. 13 is a flow chart illustrating the operations performed by the analyzer ANA and a text preparator TP in the text making apparatus as the first embodiment.

The plan constructor PC constructs plans corresponding to the goals given by the understander UND (Step S6 in FIG. 13). In Steps S7 and S13, the system works out plans for goals for which plans could not be obtained with the knowledge from the domain knowledge base DKB (see FIG. 9C) using the knowledge from the child care expert knowledge base EKB. In this operation, the individual data base IDB is retrieved (Step S9) or updated as desired. More practically, the process control switch PCS controls the direction of delivery of information in accordance with the plan brought about by the plan constructor PC. Namely, in the case of the example shown in FIG. 11, the information which is the user's goal is delivered to the inference engine IE expert system for the purpose of consultation with the expert system.

The inference engine has the function of solving problems the causes of which have to be found by the human being. The inference engine IE makes a search through the expert knowledge base EKB to obtain an adequate information which conforms with the purpose. In the case of the example shown in FIG. 11, the system recognizes causes of "CRYING AT NIGHT" such as hunger, insufficient exercise, too much midday nap and so forth. At the same time, the system recognizes that the cause of the previous "CRYING AT NIGHT" of the same baby was "hunger" from the individual database IDB.

In this embodiment, the cause of the previous "CRYING AT NIGHT", i.e., "hunger" is presented for confirmation in advance of a retrieval which is conducted without any course or policy, and, when retrieval of other causes has become necessary, i.e., when the "hunger" was determined as not being the cause in the present case, the "hunger" is deleted from the object of the retrieval. This is because the "hunger", which was the cause of the previous case, is most probable as the cause in the present case. In fact, the same symptoms are often attributed to the same cause.

These pieces of information are sent to the text preparator TP of the natural language synthesizer TP for the purpose of preparing the counter-question, i.e., presentation of causes. Output items determined already. e.g., the goal, plan, action, actor and so forth, are available in the text preparator TP so that the text preparator TP is required only to send these items to the generator GEN. The generator GEN transforms this message from the language handled in the system into the natural language used and understood by the user. Thus, the system delivers the counter-question "LAST TIME IT WAS HUNGER, I REMEMBER" which suggests that the cause might be "hunger" also in this case (Step S11) as shown in FIG. 11, and delivers this message to the output unit OUT. The output is preferably executed by display or by means of voice synthesizer.

The user is required to respond to the counter-question which is posed by the system in response to the query inputted to the system by the user.

In the case of the example shown in FIG. 11, the user answers "WELL, SHE COULD BE HUNGRY". This answer is input as new information to the system through the input unit IN.

Thus, the same process as that described before is commenced again starting with Step S1. However, execution of the process conducted for the re-retrieval of the goal and/or plan in response to the new information mentioned above is different from the preceding execution of the process in that the system has already understood that it is in the course of finding a remedy of the mother from the CRYING AT NIGHT" of the baby. Therefore, the understander UND is required to identify a new goal as a sub-goal subordinate to the goal identified and used in the preceding execution of the process.

This operation is continued until the initial goal, i.e., the remedy from the situation of "crying at night" is achieved.

The algorithm of the response of the system to the user's query "WON'T STOP TO CRYING AT NIGHT" has been described.

A description will be provided of a case where a query "WHEN DID AKI TAKE HER FIRST STEP?" is posed by the user instead of the "WON'T STOP TO CRYING AT NIGHT".

In this case, the system understands that a request is made to read the user's data base. The process is executed through Step S7, Step S8, Step S9 and Step S10.

Conversely, when a message of a report type, e.g., "AKI INOCULATED TODAY" is understood by the system as being a request for entry to the user's data base (see FIG. 9E). In this case, Steps S7, S8, S12 and S10 are followed in the mentioned order.

As will be understood from the foregoing description, according to the advice system as the second embodiment of the invention, it is possible to deal with the user's command through determination of the goal of the command on the basis of a natural language processing, even when the user's command lacks detailed information.

FIGS. 14 and 15 show a modification of the second embodiment having a different form of the knowledge base. In the second embodiment, when a query of the user concerning what to cook is given, such a replying operation as shown in FIG. 15 is performed.

More specifically, when the user gives a query to the system "I'm at a loss for what to have today", then the system knows that a goal for the user is to "cook meals". The system retrieves the goal from the data base and knows the goal is accompanied by a plan "have ingredients", and then infers that the plan is necessary for the user. It inquires of the user whether the plan is satisfactory for the user by asking the user "Run short of something?". When the system receives a negative reply from the user "No, I want to cook something nice, but I can't think of anything" in response to the above "Run short of something?", it infers that a plan "decide recipe" which follows "have ingredients" is necessary. The system also determines that, plans "know recipe and search recipe" of a goal "decide recipe" are necessary for the user. Although it is necessary to specify ingredients in order to "know recipe and search recipe", the system already knows the user has some ingredients, and it asks the user "What ingredients are available?". The user responds to the query with "Well, today I have some ham, cauliflower, lettuce, and celery. Oh, I also have some eggplants". Then, the system outputs cooking method candidates on the basis of a data base which has been designed to include various information from cook guide books. In the output, the system outputs as candidates not only cooking methods which are available from the ingredients the user gave, but also cooking methods which cannot be made solely from the ingredients at hand. In this connection, the ingredients which are lacking are additionally outputted by the system. Thus, the system gives the user the response "Fine, you can make ham-stuffed cauliflower, what we call gipsy pie and a German dish. If you can come up with some apples, you can make Italian salad with lettuce and celery." The use of the knowledge base shown in FIG. 13 enables the system to provide information for enabling the user to overcome problems encountered in cooking. It will be understood that the system of the present invention can be used for solving problems not only in child care but also in various other fields.

Although the invention has been described through its specific forms, it is to be understood that the described embodiments are only illustrative and various equivalency and modifications thereof fall within the scope of the invention which is limited solely by the appended claims.

What is claimed is:

1. A knowledge information processing system for processing a sentence described in a natural language, comprising:

actor data base means for storing data concerning actors, said data being adapted to be retrieved;

goal-plan knowledge data base means for storing relational data between goals and plans, and between the plans and actions, and for permitting retrieval of the data stored therein;

input means for inputting a sentence described in the natural language;

parser means for parsing the input sentence and detecting at least an actor in the sentence;

actor data searching means for searching said actor data base means for data relating to the detected at least one actor;

goal deducing means for deducing a goal indicated by the input sentence and retrieving the goal from said goal-plan knowledge data base means;

plan-action retrieval means for retrieving, from said goal-plan knowledge data base means, a plan and an action corresponding to the goal deduced by said goal deducing means using the deduced goal and using the actor data searched by said actor data searching means;

construction means for constructing an output sentence from the plan and the action retrieved by said plan-action retrieval means; and output means for outputting the output sentence.

2. A system according to claim 1, wherein the input sentence is a query and the output sentence is an answer to the query.

3. A system according to claim 2, wherein said output means includes:

text forming knowledge base means for retrievably containing text forming data necessary for constructing elements of texts formed by the natural language;

means for retrieving said text forming data in accordance with the plan and action retrieved by said plan-action retrieval means so as to find and pick up text forming data corresponding to the plan and action; and conversion means for converting the plan and action into the natural language by using the picked up text forming data.

4. A system according to claim 2, further comprising:

means for deducing a theme of the query on the basis of the actor data searched by said actor data searching means; and means for inferring information from the searched actor and the deduced theme;

wherein said goal deducing means deduces the goal of the query using the inferred information.

5. A system according to claim 4, wherein said actor data base means has data arranged time-sequentially in relation to the theme.

said goal-plan knowledge data base means contains knowledge data in a tree structure retrievable form according to the goal, wherein said construction means, when a plurality of combinations of plans and actions are obtained for the goal deduced by said goal deducing means, retrieves said tree structured knowledge data of said goal-plan knowledge data base means and the time-sequential individual data in said actor data base means, so as to determine a goal indicated by the input sentence, and constructs a plan and an action for enabling discrimination of a plan which if implemented accomplishes the deduced goal, and delivers the constructed plan and action to said output means.

6. A system according to claim 1, wherein the input sentence is an instruction and the output sentence is a response to the instruction, and wherein said output means further comprises conversion means for converting the plan constructed by said construction means into a text form.

7. A system according to clam 6, wherein said actor searching means searches for at least two actors in the input instruction.

8. A system according to claim 7, further comprising:

means for deducing a theme of the instruction by searching for a common information from the data of said at least two actors; and means for inferring information from the actors and the theme; and wherein said goal deducing means deduces the goal of the instruction using the inferred information.

9. A system according to claim 6, wherein said conversion means includes:

text forming knowledge base means for retrievably storing knowledge items necessary for the construction of elements of texts written in the natural language;

means for retrieving said knowledge items in accordance with the plan constructed by said construction means so as to pick-up text forming knowledge items corresponding to the plan, and the picked-up text forming knowledge; and means for converting said plan into the natural language by making use of the picked-up information items.

10. A system according to claim 6, wherein said goal deducing means further comprises:

means for searching for a higher order goal of a higher order with respect to the deduced goal deduced by said goal deducing means, and wherein said plan-action retrieval means retrieves a final plan action on the basis of the higher order goal.

11. A system according to claim 6, further comprising means for searching for a sub-goal subordinate to said goal deduced by said goal deducing means.

12. A system according to claim 6, wherein the instruction is a letter writing instruction, and wherein said plan-action retrieval means includes:

record data base means recording the transmission from the user of the system to a correspondent;

means for detecting a verb corresponding to a reply in the letter writing instruction; and means for retrieving, in response to detection of the verb, the purpose of the initial transmission from the correspondent from information in said actor data base and from the record of the correspondence in said record data base means.

13. A knowledge information processing method for processing, within a knowledge information processing system, a sentence described in a natural language, comprising the steps of:

receiving data representing a sentence described in the natural language in the knowledge information processing system;

parsing the received data representing a sentence and detecting at least one actor-identifier comprising a word or a phrase contained in the parsed sentence, the actor-identifier representing an actor in the sentence;

searching an actor data base in the knowledge information processing system, which contains previously stored data concerning actors, for actor-data relating to the detected at least one actor-identifier and retrieving the actor-data from the actor data base;

deducing goal-data indicated by the input sentence by retrieving goal-data from a goal-plan knowledge data base in the knowledge information processing system, which contains previously stored relational data between goals and plans, and between the plans and actions corresponding thereto, the goal-plan knowledge data base permitting retrieval of the data stored therein;

retrieving, from the goal-plan knowledge data base, plan data and action data corresponding to the deduced goal data and the searched actor-data;

generating in the knowledge information processing system data representing an output sentence from the retrieved plan data and action data; and outputting the constructed output sentence from the knowledge information processing system.

14. A knowledge information processing method for processing, within a knowledge information processing system, a sentence described in a natural language, comprising the steps of:

receiving data representing a sentence described in the natural language in the knowledge information processing system;

parsing the sentence represented by the received data and detecting at least one person-identifier comprising a word or a phrase contained in the parsed sentence, the person-identifier representing a person in the sentence;

searching a data base in the knowledge information processing system, which contains previously stored personal data concerning respective persons, for personal data relating to the person represented by the detected at least one person-identifier, the personal data being permitted to be retrieved;

inferring goal data indicated by the input sentence by retrieving the goal data from a knowledge base in the knowledge information processing system which contains previously stored relational data between goals and plans, and between the plans and actions corresponding thereto, the knowledge base permitting retrieval of the data stored therein;

retrieving, from the knowledge base, plan data and action data corresponding to the inferred goal data and the searched personal data;

generating in the knowledge information processing system, data representing an output sentence from the retrieved plan data; and outputting the generated output sentence from the knowledge information processing system.

15. A method according to claim 14, wherein said step of inferring goal data further comprises the steps of:

searching the knowledge base for higher order goal data of the inferred goal data; and retrieving, from the knowledge base as final plan data, plan data corresponding to the higher order goal data.

* * * * *

UNITED STATES PATENT AND TRADEMARK OFFICE
CERTIFICATE OF CORRECTION

PATENT NO. : 5,282,265                             Page 1 of 2
DATED      : January 25, 1994
INVENTOR(S): ARUNA ROHRA SUDA, ET AL.

It is certified that error appears in the above-indentified patent and that said Letters Patent is hereby corrected as shown below:

IN THE DRAWINGS:

SHEET 6 OF 26 (FIG. 5A)
   "Livingbeings" (one occurrence) should read --Living beings--.
   "Livingbeing" (two occurrences) should read --Living being--.

SHEET 11 OF 26 (FIG. 6B)
   "EXEISTS ?" should read --EXISTS ?--.

SHEET 15 OF 26 (FIG. 9A)
   "Livingbeings" (one occurrence) should read --Living beings--.
   "Livingbeing" (two occurrences) should read --Living being--.
   "Place" should read --Places--.

SHEET 21 OF 26 (FIG. 11)
   "Stop to Crying" should read --Stop Crying--.

COLUMN 1
   Line 51, "encounters" should read --encountered--.
   Line 66, "tends" should read --tend--.

COLUMN 4
   Line 10, "April" " should read --April".--.

COLUMN 5
   Line 67, "DKB" " should read --DKB--.

UNITED STATES PATENT AND TRADEMARK OFFICE
CERTIFICATE OF CORRECTION

PATENT NO. : 5,282,265
DATED : January 25, 1994
INVENTOR(S) : ARUNA ROHRA SUDA, ET AL.

It is certified that error appears in the above-indentified patent and that said Letters Patent is hereby corrected as shown below:

COLUMN 9
Line 47, "U *" should read --*--.

COLUMN 10
Line 63, "etc" should read --etc.--.

COLUMN 11
Line 38, "ond:" should read --ond--.

COLUMN 13
Line 27, " "WELL,SHE" should read --"WELL, SHE--.

COLUMN 15
Line 63, "TO" should be deleted.
Line 68, "TO" should be deleted.

COLUMN 17
Line 57, "theme." should read --theme,--.

COLUMN 18
Line 30, "pick-up" should read --pick up--.

Signed and Sealed this

Thirtieth Day of August, 1994

Attest:

BRUCE LEHMAN

Attesting Officer     Commissioner of Patents and Trademarks